United States Patent [19]

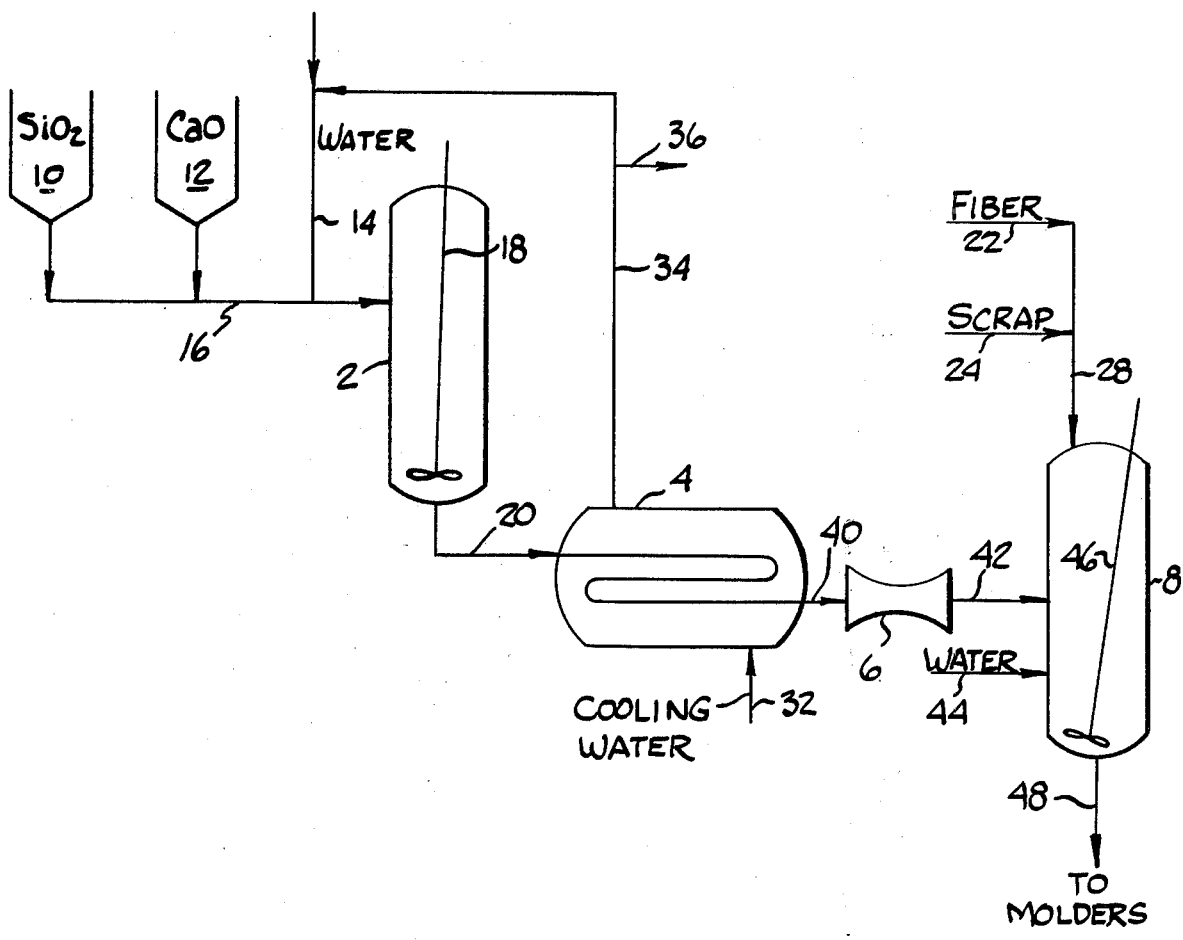

Whitaker et al.

[11] 4,131,638
[45] Dec. 26, 1978

[54] PROCESS FOR THE MANUFACTURE OF CALCIUM SILICATE HYDRATE OBJECTS

[75] Inventors: Thomas E. Whitaker; Samuel Myles, both of Littleton, Ohio; Ian P. Gardner, Whitby, Canada

[73] Assignee: Johns-Manville Corporation, Denver, Colo.

[21] Appl. No.: 813,192

[22] Filed: Jul. 5, 1977

[51] Int. Cl.$^2$ .............................................. C04B 1/00
[52] U.S. Cl. .................................... 264/333; 106/120; 264/40.3; 264/40.4; 264/40.7
[58] Field of Search ................. 264/333, 65, 66, 40.4, 264/40.7, 40.1, 40.6, 40.3; 106/120

[56] References Cited

U.S. PATENT DOCUMENTS

| | | | |
|---|---|---|---|
| Re. 19,005 | 11/1933 | Wilner | 106/25 |
| 2,215,891 | 9/1940 | Thomson et al. | 106/120 |
| 2,547,127 | 4/1951 | Kalousek | 106/120 |
| 2,665,996 | 1/1954 | Kalousek | 106/120 |
| 2,699,097 | 1/1955 | Binkley | 106/120 |
| 2,748,008 | 5/1956 | Kalousek | 106/120 |
| 3,116,158 | 12/1963 | Taylor | 106/106 |
| 3,501,324 | 3/1970 | Kubo | 106/120 |
| 3,679,446 | 7/1972 | Kubo | 106/120 |
| 3,816,149 | 6/1974 | Zettel | 106/120 |

OTHER PUBLICATIONS

Johns-Manville, Insulation Product Information, No. IN-375A, 1/1970, 2 pps.
Chemistry of Cements, H. F. W. Taylor, vol. 1, 1964, Academic Press, pp. 169–170.

*Primary Examiner*—Donald J. Arnold
*Attorney, Agent, or Firm*—Robert M. Krone; Joseph J. Kelly; James W. McClain

[57] ABSTRACT

An improved "pre-autoclaving" process for the formation of fiber-reinforced calcium silicate hydrate bodies (such as thermal insulation) is disclosed. The improvement comprises first cooling the crystal slurry from the reactor in a heat exchanger and then metering the cooled slurry through a venturi to reduce the pressure and control the flow rate.

6 Claims, 1 Drawing Figure

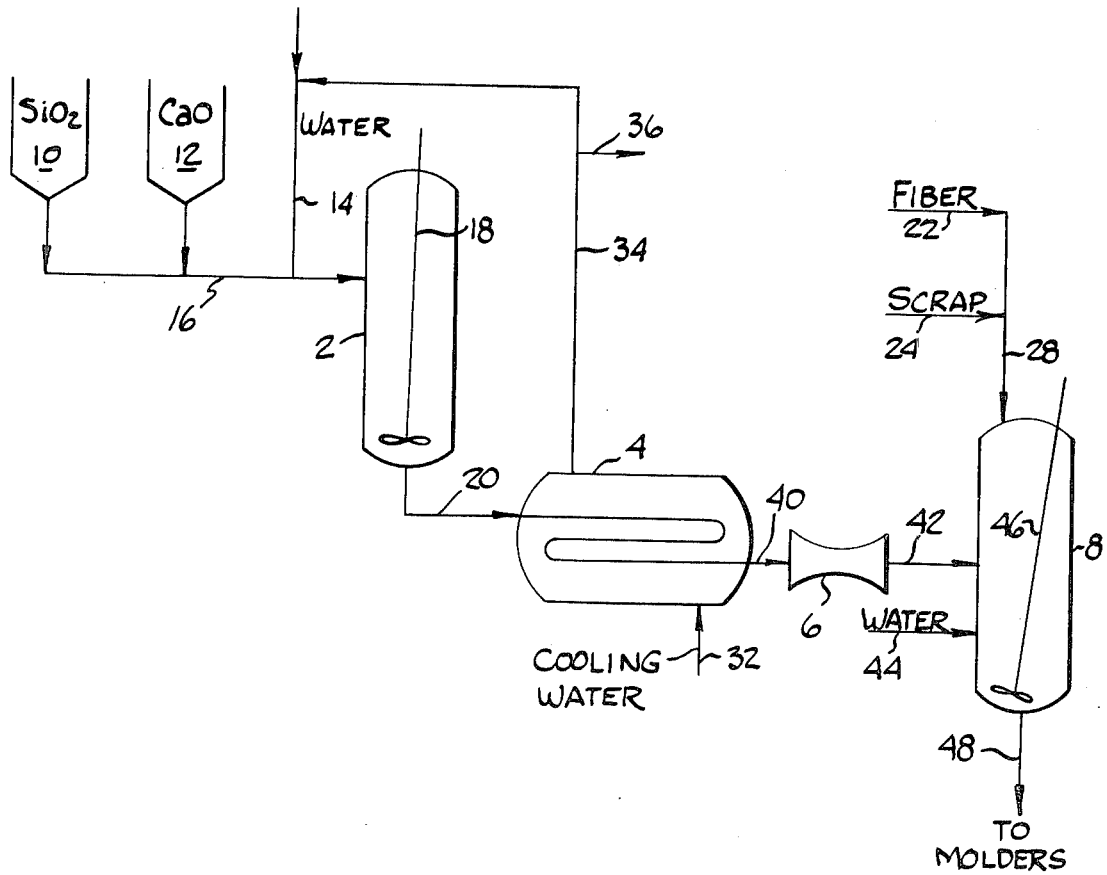

PROCESS FOR THE MANUFACTURE OF CALCIUM SILICATE HYDRATE OBJECTS

BACKGROUND OF THE INVENTION

The invention herein relates to processes for the formation of calcium silicate hydrate objects, such as blocks of thermal insulation.

Calcium silicate hydrate bodies such as thermal insulation blocks have been in use for many years. For a long time such blocks were reinforced by asbestos fibers and were formed by a process known as "post-autoclaving" in which the raw materials (generally lime, silica and asbestos fiber) were mixed in an aqueous medium and then poured into molds having the shape of the blocks to be formed. The slurries of the raw materials in the molds were then autoclaved for in situ formation of calcium silicate hydrate objects directly in their desired form. This type of process was possible because the asbestos reinforcing fiber was not significantly degraded by the high temperature and high alkalinity conditions in the autoclave. Typical of such products was an asbestos-reinforced calcium silicate hydrate insulation sold commercially by the Johns-Manville Corporation under the trade name THERMOBESTOS.

Several years ago calcium silicate hydrate insulations appeared which were reinforced by materials other than asbestos, notably glass fibers and fibers of organic polymers such as polyesters. Because the glass and polymer fibers were degraded by the temperature and alkalinity conditions of autoclaving, it became a practice to form calcium silicate hydrate insulations by a process known as "pre-autoclaving." In this process the calcareous and siliceous raw materials of the calcium silicate hydrate are slurried in an aqueous medium and autoclaved to form fragile agglomerates of calcium silicate hydrate crystals. Following formation of the agglomerates the slurry is removed from the reaction vessel and the fibrous reinforcement is added to the slurry. The slurry of fibers and agglomerates is then passed to molding devices where the fiber reinforced calcium silicate hydrate insulation blocks are formed by pressure or vacuum molding to compress and interlock the agglomerates with each other. A typical description of such a process and the products formed therefrom will be found in U.S. Pat. Nos. 3,501,324 and 3,679,446. Materials of this type have been made and sold commercially by the Johns-Manville Corporation under the trademark THERMO-12. Other patents describing the hydrothermal formation of the calcium silicate hydrates and various aspects of the processing thereof include U.S. Pat. No. Re. 19,005 and U.S. Pat. Nos. 2,215,891; 2,665,996; 2,699,097; 3,116,158 and 3,816,149.

A particularly critical phase of a "pre-autoclaving" process occurs when the calcium silicate hydrate crystal agglomerate formation has been completed but the reaction slurry is still being held under high pressure and temperature in the reaction vessel. In order to be able to make the slurry available to the molders the temperature and pressure must be reduced. Pressure is normally reduced to ambient pressure since molders generally operate from reservoir tanks of slurry which are open to the atmosphere. Temperature must also be reduced to a level at which there is no significant tendency for the slurry to boil at ambient pressure or otherwise exhibit detrimental temperature effects. Originally pressure and temperature were reduced by simply venting the high pressure steam in the reaction vessel to the atmosphere. This was found to be extremely wasteful of thermal energy and in addition generally caused the reaction slurry to boil violently and break up the fragile agglomerates, thus severely degrading the critical crystal structure of the calcium silicate hydrate to the extent that the product did not mold satisfactorily. These problems were essentially entirely overcome by the development of the process described in aforesaid U.S. Pat. No. 3,816,149 issued to Joseph H. Zettel. In the Zettel process cooling water is injected into the slurry while the latter is at elevated temperature and pressure in the reaction vessel. The cooling water condenses the steam, lowering the temperature and pressure, and simultaneously dilutes the slurry to the concentration later used for molding. Condensation of the steam rather than venting eliminates boiling and fracture of the agglomerates, thus resulting in high yields of readily moldable calcium silicate hydrate crystals. Thermal energy is also conserved by being used to heat the cooling water and slurry mixture to the proper temperature for molding. With these distinct advantages the Zettel process has been used successfully in calcium silicate hydrate plants for several years.

The Zettel process has one significant drawback, however. Because the quantity of cooling water required to quench the reactor and condense the steam to "approximately ambient pressure" (as defined in the Zettel patent) is roughly equal in volume to the amount of aqueous slurry originally in the reactor, the reactor can only be filled about half full initially. Thus, during the entire reaction period the reaction vessel is only half full of material. Obviously if the vessel could be substantially completely filled initially with raw material, twice as much calcium silicate hydrate could be formed during each run period, in effect doubling production capacity of a given production unit without any increase in the number or size of reactors.

It is therefore an object of this invention to provide a calcium silicate hydrate reaction process which permits maximum utilization of the reaction process equipment.

It is also an object of this invention to provide a calcium silicate hydrate reaction process which significantly increases the production rate of calcium silicate hydrate as compared to the prior art processes.

It is also an object of this invention to provide a calcium silicate hydrate reaction process which provides significant conservation of thermal energy used in the process.

SUMMARY OF THE INVENTION

The invention herein is an improvement in a process for the formation of shaped calcium silicate hydrate objects which comprises forming an aqueous slurry of a siliceous material and a source of calcium oxide, heating the slurry in a reactor in the presence of saturated steam at a pressure of at least 75 psig (6.1 atm.) for a period of at least 0.5 hour to form hydrated calcium silicate crystals from the siliceous material and the source of calcium oxide, removing from the reactor the hydrated calcium silicate crystals in the form of a slurry of said crystals dispersed in aqueous medium, forming the crystals into shaped objects while simultaneously separating a portion of the aqueous medium from the crystals and then drying the shaped objects. In this invention the improvement comprises (a) passing the slurry through a heat exchanger where the temperature of the slurry is substantially reduced and (b) thereafter metering the cooled slurry through a venturi to reduce the pressure and control the flow rate of the slurry into a receiver from which receiver the slurry can be subsequently withdrawn for molding into the objects.

BRIEF DESCRIPTION OF THE DRAWING

The single FIGURE of the drawing is a schematic diagram illustrating the process of this invention.

DETAILED DESCRIPTION AND PREFERRED EMBODIMENTS

The process of this invention may be best understood by reference to the flow diagram in the drawing. The principal processing units utilized in this invention are the reaction vessel 2, the heat exchanger 4, the venturi 6 and the receiver 8.

The raw materials for the reaction are a siliceous component (i.e., a source of silica) and a source of calcium oxide. The siliceous component may include any natural or synthetic amorphous silica or silicate or mixtures thereof. Typical examples include quartz, silica flour, siliceous sand, diatomaceous earth, clays, silica gel, and the like. Small amounts of other compounds in addition to silica may be present in the siliceous material, such as alumina, and in fact may be advantageous in the formation of particular crystalline forms of calcium silicate hydrate. The source of calcium oxide in this invention may be any of a number of common calcareous materials such as quicklime, slaked lime, acetylene residuum, carbide residuum, and the like. With the exceptions noted it is desirable that these materials be as free as practicable of materials other than a source of calcium oxide and a source of silica. Experience has shown that the presence of significant amounts of impurities in the raw materials can have a detrimental effect on the calcium silicate hydrate formation reaction and the moldability of the resulting crystalline agglomerates. A number of commercial sources of suitable raw materials are currently available. Those materials which are in common use as raw materials in current calcium silicate hydrate pre-autoclaving processes are entirely satisfactory for the process of this invention.

(For brevity herein the siliceous material will frequently be referred to merely as "silica" and the source of calcium oxide referred to merely as "lime." It will be recognized, however, that these references are not meant to be limiting.)

The mole ratio of lime to silica will generally range from about 0.5:1 to 3.0:1 depending on the particular crystalline hydrate desired. The mole ratio will preferably be in the range of approximately 0.6:1 to 2.0:1.

The silica and lime are fed into the process from supply units 10 and 12 respectively. They are mixed with water from line 14 in line 16 or in a mixing vessel (not shown).

The aqueous lime/silica slurry is then passed to reaction vessel 2 which is a suitable pressure vessel such as a conventional autoclave with provision for agitating the slurry. Unlike the prior art Zettel process which required that the reaction vessel be kept at least half empty in order to accommodate the subsequent influx of quenching water, the reaction vessel 2 in the present invention can be filled substantially full with the aqueous lime/silica slurry. The vessel will not be completely full, for there will be provision of space for injection of steam. Therefore, within the meaning of the present invention, "substantially full" means that essentially all of the space within the vessel normally considered to be usable can in fact be utilized.

The concentrated slurry containing the lime and silica is heated by high pressure steam. The steam pressure is generally in the range of from 75 psig to 500 psig (6.1 to 35 atm.), preferably 100 psig to 200 psig (7.8 to 14.6 atm.). The temperature will be that of saturated steam at the particular pressure; thus the broad temperature range will be from about 321° F to about 470° F (160° C to 243° C) and the preferred temperature range will be from 338° F to 388° F (170° C to 198° C). The particular pressure and associated temperature which are used will be determined by the predominant type of calcium silicate hydrate crystal which is desired. The time of reaction at the operating temperature will also be determined by the type of crystalline form of the calcium silicate hydrate desired. Normally reaction time will be between 0.5 hours and 20 hours, preferably 2 hours to 8 hours. The particular hydrothermal reaction conditions which favor the formation of one crystalline type over another are amply described in the art. For instance, U.S. Pat. No. 2,665,996 describes the different conditions which favor respectively the formation of a calcium silicate hydrate with the formula:

or a calcium silicate hydrate with the formula:

The patent also mentions other conditions which may lead to the formation of gyrolite, calcium silicate hydrate II, hillebrandite, and/or calcium silicate hydrate I. Similarly U.S. Pat. No. 3,501,324 describes the conditions which lead respectively to tobermorite and xonotlite.

The slurry which contains the source of calcium oxide and the siliceous material will have a water:solids weight ratio in the range of from 3:1 to 8:1, preferably 4:1 to 6.5:1. Normally the amount of water present will be no more than that sufficient to permit an adequate dispersion of the raw materials and to permit proper growth of the crystals during the hydrothermal reaction. It is a principal feature of this invention that the process does not involve the heating under pressure of any water other than that needed in order to permit proper crystal growth.

During the crystallization step the concentrated slurry will be agitated or stirred at least part of the time. It is preferred that the agitation be moderate and constant during the crystallization step, although if desired periodic agitation can be used. In the latter case it is preferred that the agitation be during the early portion of the crystallization step and followed by a period of quiescense. Agitation may be by any conventional means 18 such as paddles, bladed mixers and the like. The degree of agitation should be such that thorough mixing of the reactants is obtained but crystal formation is not substantially impeded. Operation of conventional agitating devices in an appropriate manner under these conditions is well within the skill of those versed in the art of mixing and need not be further detailed here.

Following completion of the crystallization step the supply of saturated steam to the pressure vessel is stopped. The phrase "completion of the crystallization step" as used herein refers to that point at which essentially all of the desired quantity of the desired type of crystals have been obtained in the slurry. The slurry is then drained from reaction vessel 2 through line 20. The pressure of the steam in the dome of the vessel serves to force the slurry through line 20, heat exchanger 4, line 40, venturi 6 and line 42 into receiver 8. Evolution of steam from the slurry water as the slurry drains keeps the pressure in the vessel relatively constant until most of the slurry has drained. The flow rate of the slurry through the heat exchanger is controlled by the venturi, as will be described below.

In heat exchanger 4 the slurry, under substantially constant pressure, is cooled generally by about 100° F–150° F (56° C–83° C). Typically the inlet temperature of the slurry will be in the range of from about 350° F to 400° F (177° C to 204° C) and the outlet temperature will be in the range of from about 200° F to 240° F (93° C to 116° C). The slurry in heat exchanger 4 is cooled by cooling water entering through line 32 and exiting through line 34. Typically the inlet water temperature will be in the range of about 35° F–80° F (2° C–27° C) and the outlet water temperature will be in the range of about 70° F–150° F (21° C–66° C). Cooling water flow rates through the heat exchanger are generally in the range of about 100–350 gal/min (380–1330 l/min) while the slurry flow rate through the heat exchanger will normally be in the range of about 25–175 gal/min (95–665 l/min). These typical rates, however, may be varied according to the type of equipment available and standard heat transfer calculations.

It is imperative in the process of this invention that the passage of the slurry through the heat exchanger not be such as to significantly degrade the crystals formed. Thus the heat exchanger flow path must be designed so that the crystal-containing slurry is cooled but not unduly agitated or subjected to strongly turbulent conditions. In experimental tests spiral tube flow paths through the heat exchanger have been found to work successfully as have longitudinal runs with 180° return bends at each end.

The flow of the slurry to receiver 8 from heat exchanger 4 must be carefully controlled to prevent splashing and turbulence in the receiver and to maintain proper flow conditions in the heat exchanger. It is critical to the present invention that the means of such flow regulation be venturi 6. It has been found that a venturi is necessary in order to allow proper flow control but yet avoid significant degradation of the crystals. Other control means such as positive displacement lobe pumps will cause severe degradation of the crystals and therefore cannot be used. The design of venturi 6 will follow conventional venturi design practice. The inlet and outlet ends of the venturi will be sized to be equal to the size of inlet pipe 40 and outlet pipe 42 respectively. The constriction of the venturi throat is normally sized to be approximately less than 20% of the cross-sectional area of the inlet and outlet and usually approximately in the range of from 1%–10% of the area of the inlet and outlet. Specific values will depend on the flow rate and pressure drop desired and may readily be determined by conventional calculations. For a slurry flow rate of approximately 55 gal/min (210 l/min) a venturi having a length of from 2–4 ft (60–120 cm) and a throat ranging from 0.5 inches to 2 inches (13–50 mm) inside diameter has been found to be entirely satisfactory. Pressure drop across the venturi will be sufficient to reduce the slurry pressure to essentially ambient. Thus the slurry having the venturi will normally be at a pressure of 0 psig (1 atm) and a temperature below 212° F (100° C).

The cooling water outflow through line 34 from heat exchanger 4 may be discarded as through line 36, but preferably will be passed through line 38 to serve as a preheated feed water stream for the process, thus maximizing the thermal efficiency of the process.

After being metered through venturi 6 the cooled and concentrated slurry of crystals is passed through line 42 to receiver 8 where it is mixed with diluting water 44. The slurry is diluted from its optimum concentration for reaction to the less concentrated slurry needed for optimum operation of molders. The solids are thoroughly dispersed in the dilute slurry by use of mixing means 46. The water-to-solids weight ratio of the diluted slurry will normally be in the range of about 8:1 to 25:1, preferably 12:1 to 20:1.

In receiver 8 the diluted slurry is mixed with fiber 22, and can also be mixed at that point with scrap calcium silicate 24. Conveniently the fiber and/or scrap can be slurried separately in a premixer (not shown) and then added to receiver 8. The water of the fiber/scrap slurry then forms part of the diluting water of the slurry in receiver 8. The fiber 22 may be any inorganic or organic fibrous reinforcing material. Inorganic materials will include asbestos fibers, rock wool and glass fibers. Organic fibers will include natural cellulosic fibers and synthetic fibrous materials such as rayons, nylons, and polyesters. The fiber will be present in the final product in an amount of up to about 15% by weight, preferably about 5% to 10% by weight. The scrap 24 will be calcium silicate hydrate in finely divided form, often waste material from the cutting of insulation blocks which has been finely ground. Scrap may be present in the final product in amounts up to about 10% by weight.

All of the diluted slurry (or portions of it) containing crystals, fiber and optionally scrap may immediately be drained from receiver 8 through line 48 for molding operations. In actual practice, however, it is common to have several receivers receiving slurry from a battery of reactors 2 or several small receivers each of which receives a portion of the crystal slurry from a single large reactor 2. In either case there will be usually a plurality of receivers from which the molders can draw diluted slurry. Thus it is common for the molders to be drawing slurry from one receiver while one or more additional receivers containing diluted slurry are held in reserve to be ready to be drawn from immediately when the first receiver is emptied. This permits virtually continuous operation of the molding process. After the calcium silicate hydrate products have been molded into the desired shape they are dried in conventional hot air dryers. The fiber reinforced products of this invention normally have average densities in the range of 11.5–14.5 lbs/ft$^3$ (0.18–0.23 g/cm$^3$), dry modulii of rupture on the order of 80 psi (5.6 kg/cm$^2$) and dry compressive strength on the order of 180 psi (12.7 kg/cm$^2$). Thermal conductivity at 700° F (370° C) mean temperature is on the order of 0.7 BTU-in/hr-ft$^2$-° F (0.86 cal-cm/hr-cm$^2$-° C). These values compare favorably with and in some cases exceed the corresponding values for asbestos fiber reinforced calcium silicate materials formed by prior art processes. The process of this invention therefore is capable of producing satisfactory calcium silicate hydrate materials for insulation and other uses in good yield with the optimum use of processing equipment and with the most efficient utilization of thermal energy.

What is claimed is:

1. In the process for the formation of shaped calcium silicate hydrate objects which comprises forming an aqueous slurry of a siliceous material and a source of calcium oxide, heating said slurry in a reactor in the presence of saturated steam at a pressure of at least 75 psig for a period of at least 0.5 hour to form hydrated calcium silicate crystals from said siliceous material and said source of calcium oxide, removing from said reactor said hydrated calcium silicate crystals in the form of a slurry of said crystals dispersed in aqueous medium, forming said crystals into shaped objects while simultaneously separating a portion of said aqueous medium from said crystals and then drying said shaped objects, the improvement which comprises:

(a) passing said slurry through a heat exchanger where the temperature of said slurry is substantially reduced; and (b) thereafter metering the cooled slurry through a venturi wherein the pressure on said slurry is reduced and the flow rate controlled into a receiver, from which receiver said slurry can be subsequently withdrawn for molding into said objects.

2. An improved process as in claim 1 wherein the temperature of said slurry is reduced in said heat exchanger by about 100° F to about 150° F.

3. An improved process as in claim 1 wherein the pressure on said slurry is reduced to ambient by said venturi.

4. An improved process as in claim 1 wherein fibers are mixed into said slurry of crystals prior to forming said crystals into said shaped objects.

5. An improved process as in claim 4 wherein finely ground scrap calcium silicate hydrate is also mixed into said slurry prior to forming said crystals into said shaped objects.

6. An improved process as in claim 1 wherein water is used as the cooling medium in said heat exchanger and thereafter the water is used as preheated feed water to said reactor.

* * * * *

UNITED STATES PATENT AND TRADEMARK OFFICE
CERTIFICATE OF CORRECTION

PATENT NO. : 4,131,638
DATED : December 26, 1978
INVENTOR(S) : Thomas E. Whitaker et al It is certified that error appears in the above-identified patent and that said Letters Patent are hereby corrected as shown below:

[75] Inventors: "THOMAS E. WHITAKER; SAMUEL MYLES, both of Littleton, Ohio;" should read --THOMAS E. WHITAKER; SAMUEL MYLES, both of Littleton, Colorado;--.

Signed and Sealed this

Twenty-second Day of May 1979

[SEAL]

Attest:

RUTH C. MASON
Attesting Officer

DONALD W. BANNER
Commissioner of Patents and Trademarks

UNITED STATES PATENT AND TRADEMARK OFFICE
CERTIFICATE OF CORRECTION

PATENT NO. : 4,131,638
DATED : JULY 11, 1978
INVENTOR(S) : WHITAKER ET AL

It is certified that error appears in the above-identified patent and that said Letters Patent are hereby corrected as shown below:

In the single figure of the drawing, the numeral --38-- and an associated lead line should be appended to the horizontal flow line which intersects line 14 and lies immediately above reaction vessel 2.

In Column 5, line 64, change "having" to --leaving--.

Signed and Sealed this

Ninth Day of December 1980

[SEAL]

Attest:

Attesting Officer

SIDNEY A. DIAMOND

Commissioner of Patents and Trademarks